United States Patent [19]
Muehllehner

[11] 3,937,964
[45] Feb. 10, 1976

[54] SCINTILLATION CAMERA WITH SECOND ORDER RESOLUTION

[75] Inventor: Gerd Muehllehner, Mount Prospect, Ill.

[73] Assignee: G. D. Searle & Co., Skokie, Ill.

[22] Filed: June 21, 1974

[21] Appl. No.: 481,694

[52] U.S. Cl............ 250/366; 250/213 VT; 250/369
[51] Int. Cl.²............................................ G01T 1/20
[58] Field of Search........ 250/363, 366, 369, 213 R, 250/213 VT

[56] References Cited
UNITED STATES PATENTS

| | | | |
|---|---|---|---|
| 3,701,901 | 10/1972 | Suhami et al. | 250/366 |
| 3,723,735 | 3/1973 | Spelha et al. | 250/366 |
| 3,732,419 | 5/1973 | Kulberg et al. | 250/366 |

*Primary Examiner*—Davis L. Willis
*Attorney, Agent, or Firm*—Walter C. Ramm; Charles H. Thomas, Jr.; Peter J. Sgarbossa

[57] ABSTRACT

A scintillation camera for use in radioisotope imaging to determine the concentration of radionuclides in a two-dimensional area in which means is provided for second order positional resolution. The phototubes, which normally provide only a single order of resolution, are modified to provide second order positional resolution of radiation within an object positioned for viewing by the scintillation camera. The phototubes are modified in that multiple anodes are provided to receive signals from the photocathode in a manner such that each anode is particularly responsive to photoemissions from a limited portion of the photocathode. Resolution of radioactive events appearing as an output of this scintillation camera is thereby improved.

7 Claims, 7 Drawing Figures 3,937,964

SCINTILLATION CAMERA WITH SECOND ORDER RESOLUTION

BACKGROUND OF THE INVENTION

Radiation imaging devices employing a laminar scintillation crystal and a plurality of photomultiplier tubes in optical communication with respect to the crystal are currently in use with particular application in the field of nuclear medicine. The basic design of such a radiation imaging device is described in U.S. Pat. No. 3,011,057. This device is commonly termed a scintillation camera, and is widely used to rapidly project an image of the distribution of radioactivity throughout an object under investigation. The object viewed is typically an organ of a living subject which has been injected with a diagnostic quantity of a radioactive tracer. A scintillation camera of this type produces a picture of the radioactivity distribution by detecting individual gamma rays emitted by the distribution by detecting individual gamma rays emitted by the distributed radioactive isotope and passed through a collimator to produce a scintillation in a thin laminar scintillation crystal. The scintillation is detected by an array of individual photomultiplier tubes which view overlapping areas of the crystal. Appropriate electronic circuits translate the outputs of the individual photomultiplier tubes into X and Y coordinate signals and a Z signal which indicated generally the energy of a scintillation event. If the energy of a scintillation lies within a predetermined acceptable range, an image representing the location of the scintillation in a two dimensional matrix will be produced and recorded. A visual display of the radioactivity distribution in an object may be obtained by coupling the X, Y and Z signals to a cathode ray oscilloscope, or other image display device. The individual scintillation events are displayed thereon as small spots of light positioned in accordance with the X and Y coordinate signals. A record of the spots of light is obtained through the use of photographic film. Alternatively, the signals indicating the scintillation occurrences and locations may be digitized and stored in electrical or magnetic form. Both options are available in commercial scintillation cameras.

BACKGROUND OF THE INVENTION

It is highly desirable to maximize the degree of spatial resolution of the scintillation camera system. This degree of resolution is measured by the minimum distance which must be maintained between radioemitters in order for the radioemitters to be imaged separately at the output of the scintillation camera. Various preventative measures are employed to prevent the degradation of resolution. For example, lead collimators are provided so that scintillations will be caused only by gamma rays striking the scintillator from a particular direction. Heretofore, however, all scintillation cameras have employed a single order coordinate determination means in the form of photomultiplier tubes having a single anode and a single cathode. This use of a single order coordinate determination means fixes in two dimensional space only a single reference point corresponding to each phototube. The images of gamma rays impacting upon the scintillator are then displayed at locations interpolated between these reference points. More specifically, in a commercial scintillation camera employing nineteen photomultiplier tubes, there are only nineteen reference points. In a scintillation camera employing thirty-seven photomultiplier tubes, there are thirty-seven reference points. To the extent that there is any non-linearity in response either in the crystal, in the photomultiplier tubes, or in the electronic processing circuitry, there is an error incurred in linearly interpolating the position of a scintillation to be recorded.

SUMMARY OF THE INVENTION

Accordingly, it is an object of the present invention to provide a second order co-ordinate determination means so that the number of fixed reference points fixed in the two dimensional matrix may be multiplied.

It is a further object of the invention to provide the second order co-ordinate determination means as an adjunct to the first order co-ordinate determination means. More specifically, a plurality of fixed reference points are produced for each phototube instead of a single fixed reference point as in conventional systems.

Another object of the invention is to increase the field of view of a scintillation camera employing the present invention. If a particular area of two dimensional space may be viewed employing a single order co-ordinate determination means, the same degree of resolution may be obtained and the overall field of view expanded by employing the second order determination means of the present invention. This makes possible a large field of view scintillation camera without increasing the number of photomultiplier tubes required.

A further object of the invention is to produce scintillation cameras with improved spatial resolution. By increasing the number of fixed reference points, the reference points become more closely spaced so that the distortions occurring in interpolating between adjacent reference points are minimized and the overall resolution of the scintillation camera improved.

BRIEF DESCRIPTION OF THE INVENTION

DETAILED DESCRIPTION OF THE INVENTION

Figure 1:
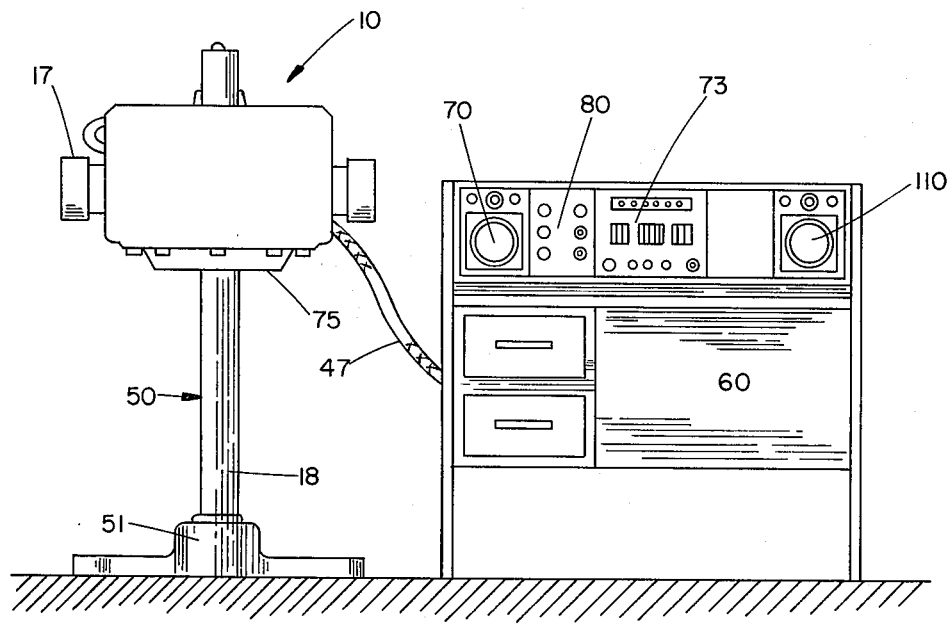
FIG. 1 is an elevational view of a scintillation camera system.

FIG. 1 illustrates the physical arrangement of a scintillation camera system according to this invention. The major elements of the scintillation camera system are the detector head 10 and a console 60. Console 60 is connected to detector head 10 by cabling 47. A stand 50 supports the yoke 17 in which is mounted the detector head 10. The stand 50 comprises a base 51 and a vertical column 18. The yoke 17 is vertically movable with respect to the column 18 and the detector head 10 is rotatable within the arms of the yoke 17. The rotation of detector head 10 and the translation of the yoke 17 are sometimes motorized so that the detector head 10 can be positioned with relative ease. A lead collimator 75 is attached to the underside of the detector head 10. This collimator may be a pinhole collimator or multichannel collimator with either parallel, converging or diverging apertures. The particular collimation configuration will vary with the intended diagnostic usage.

Console 60 contains all the power supplies needed for the detector head, stand, and console equipment. Console 60 typically includes a main display module 70, amplifying and position computing circuitry 80, central control module 73, and an auxiliary display module 110. The amplifying and position computing circuitry develops rectilinear coordinates for a detected radioactive event. When radiation is detected, a pulse amplitude signal is produced which is proportional to the energy of the scintillation. Coordinate indication signals are normalized against the pulse amplitude signal, and pulse height analysis circuitry produced a trigger or unblanking signal when the pulse amplitude signal is within a preselected amplitude range. Display module 70 acts as a location registration device to display the outputs of the amplifying and position computing circuitry 80 for registering and recording the co-ordinates of detected radiation. This recordation occurs on a cathode ray tube where the rectilinear coordinate signals which accompany a trigger signal appear and are photographed. Control module 73 contains scaling and timing circuitry with registers and digital display apparatus together with other control features. Display module 110 can repeat the display of information on module 70 or accept other information for simultaneous display.

Figure 2:
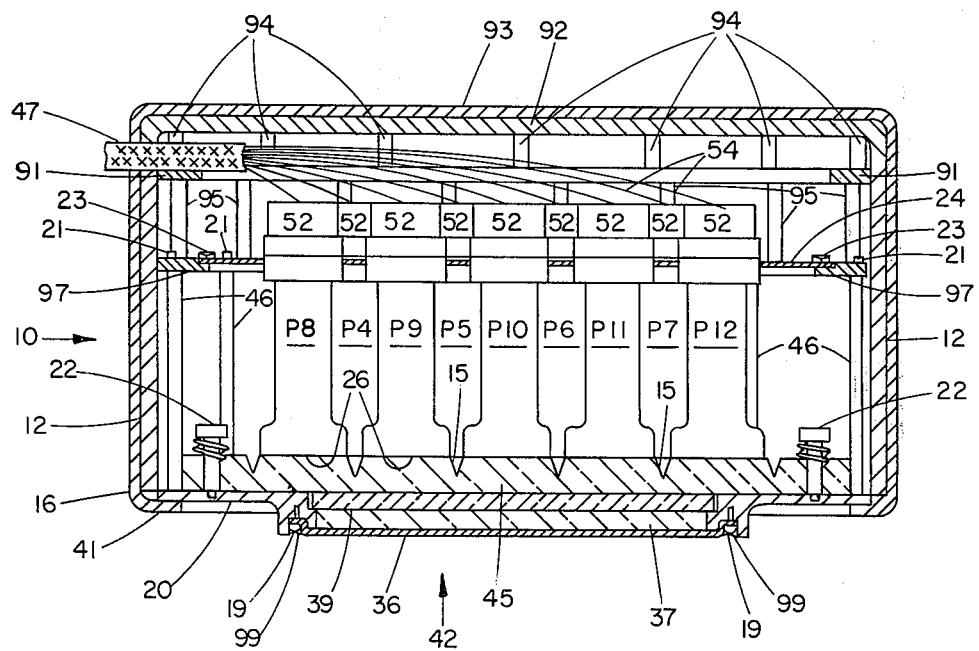
FIG. 2 is a sectional elevational view of the detector head of FIG. 1.
Figure 3:
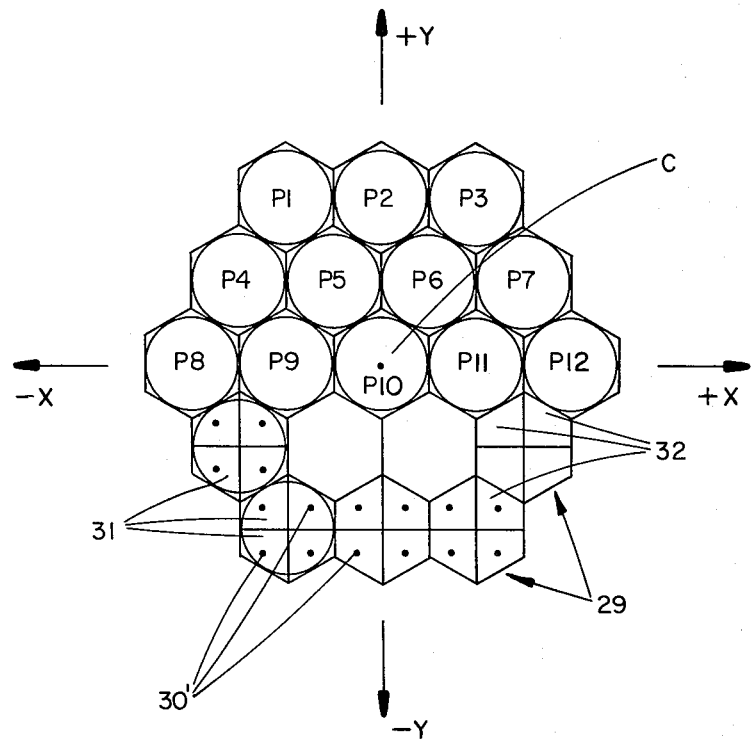
FIG. 3 illustrates a two dimensional matrix and the relationship of the phototubes of the scintillation camera to the matrix.
Figure 4:
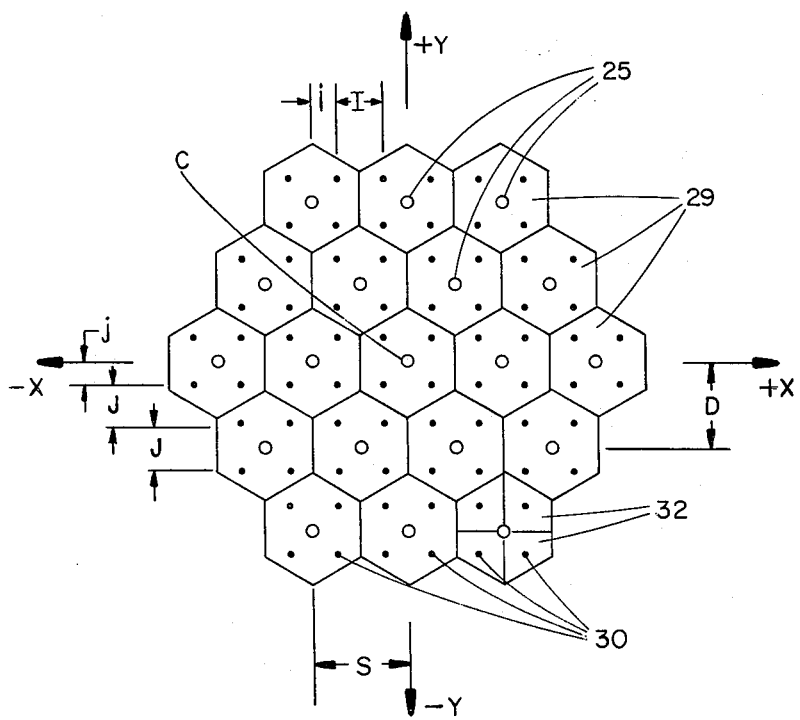
FIG. 4 illustrates a two dimensional coordinate system and the improved resolution achieved by the coordinate determination means of the present invention.

With particular reference to FIG. 2, it can be seen that the detector head 10 is comprised of a metal jacket 16 within which is disposed radiation shielding 12, constructed of lead or other radiation absorbing material. A similar radiation shield 92 is located within a head cover 93 disposed above the casing body 16. The lower edge of body casing 16 terminates in an inwardly extending flange 41 which supports an annular steel frame 20 and a scintillation crystal assembly 42. The operative element of the scintillation crystal assembly 42 is a laminar or planar scintillation crystal 37 which is entrapped between a thin aluminum shield 36 and a transparent glass cover disc 39. The scintillation crystal 37 is a thalium activated sodium iodide crystal. Because the crystal 37 is hydroscopic, it must be completely encapsulated as indicated. The aluminum shield 36 is fastened to frame 20 by means of machine screws 19 which are embedded in a potting compound 99. A light guide 45 is comprised of a clear plastic capable of transmitting ultraviolet light and is held in intimate contact with the glass cover disc 39 of the scintillation crystal assembly 42 by means of spring-biased bolts 22 which extend through the light guide and into the steel frame 20. Within the radiation detector head are positioned a plurality of photomultiplier tubes P1 through P19 having light sensitive faces 26 lying in intimate contact with pedestals of the light guide 45 which are separated from each other by V-shaped grooves 15 Nineteen photomultiplier tubes are used in the preferred arrangement, and these are positioned above the scintillation crystal 37. It can be seen that the light sensitive faces 26 of the photomultiplier tubes lie in a plane parallel to the scintillation crystal assembly 42 and are spaced therefrom by the light guide 45 interposed therebetween. The positions of some of the photomultiplier tubes (P1 through P12) with respect to each other is illustrated in FIG. 3. Photomultiplier tube P10 lies above the center of the scintillation crystal 37, and the center of the light sensitive face of photomultiplier tube P10 defines the point or origin C of a two dimensional coordinate system divided into quadrants by an X axis and a Y axis as indicated in FIG. 3 and FIG. 4. It should be noted that the view of FIG. 2 corresponds to a section taken along the X axis of FIG. 3. The photomultiplier tubes are laterally restrained at their upper ends by a restraining plate 24 which is attached to a bearing ring 97 by means of screws 23. Bearing ring 97 is fastened to the upper ends of upright columns 46 by means of screws 21. The lower ends of columns 46 are fastened to annular frame 20 by means of flat head screws (not visible). Extension columns 95 extend upward from bearing ring 97 at spaced intervals offset from columns 46. Extension columns 95 are attached at their lower ends to bearing ring 97 and at their upper ends to an intermediate annular ring 91. Cover bearing supports 94 extend upward from intermediate ring 91 and are fastened thereto at spaced intervals offset from columns 95. The supports 94 carry the weight of the cover 93.

The photomultiplier tubes P1 through P19 are normally spring-biased into intimate contact with the light guide 45 by coil springs positioned about the photomultiplier tubes and maintained in compression by the lower flared ends of the photomultiplier tubes P1 through P19 and by restraining plate 24. The springs have been omitted to improve the clarity of the illustrations by avoiding unnecessary detail. The upper ends of the photomultiplier tubes are each plugged into an electrical socket 52 from which cords 54 containing electrical leads extend. Cords 54 are combined into a cable 47 that leaves the radiation detecting head to connect it to the console 60.

The scintillation camera illustrated is used to determine the distribution of radiation emanating from an object and to record the locations of interaction of quanta of radiation with the scintillation crystal 37. The flashes of light produced by the scintillation crystal 37 at the points of impinging radiation are detected and registered as coordinates in a two dimensional matrix or co-ordinate system. The laminar scintillation crystal 37 thereby acts as a transducer to transform the energy emitted by radionuclides or radioisotopes into visible light.

The photomultiplier tubes P1 through P19 are spaced from the crystal 37 by means of a light pipe 45 to view overlapping areas of the crystal. The particular areas of the scintillation crystal 37 which are viewed mutually overlap so that light emanating from a point in the scintillation crystal 37 will be detected by more than one photomultiplier. Collectively, the photomultiplier tubes P1 through P19 along with position responsive circuitry serve as a first order co-ordinate determination means for producing output signals representing principal points in a rectangular matrix spaced from each other at predetermined intervals. A single photomultiplier tube and its associated position responsive circuit are enclosed within the dashed lines of envelope 5 in FIG. 7. Collectively, all of the component elements corresponding to those encompassed within the envelope 5 for all of the photomultiplier tubes may be considered to be the first order co-ordinate determination means of the illustrated embodiment. The principal points defined by the first order co-ordinate determination means are designated by the numerals 25 in the rectangular co-ordinate system illustrated in FIG. 4 and correspond to the centers of the light sensitive faces 26 of the photomultiplier tubes. The position coordinates of incident radioactive emissions in the two dimensional co-ordinate system are derived from the output signals of the photomultiplier tubes after processing by the amplifying and position computing circuitry of the scintillation camera system. The total output of each photomultiplier tube may be considered to be a coarse co-ordinate signal from which the location of detected radioactive events may be derived by interpolating distances between the principal reference points 25 in FIG. 4 in response to the respective total outputs of each photomultipler tube.

Considered another way, the photomultiplier tubes P1 through P19 are associated position responsive circuitry forming the first order co-ordinate determination means of the system may be considered to quantitatively signal the amount of light received from each of nineteen different hexagonal areas 29 for each detected scintillation event as illustrated in FIG. 3. Although each phototube views overlapping areas, a separate phototube may be considered to be associated with each of the hexagonal areas 29. These hexagonal areas 29 represent coterminous composite areas of a two dimensional field of view.

Figure 5:
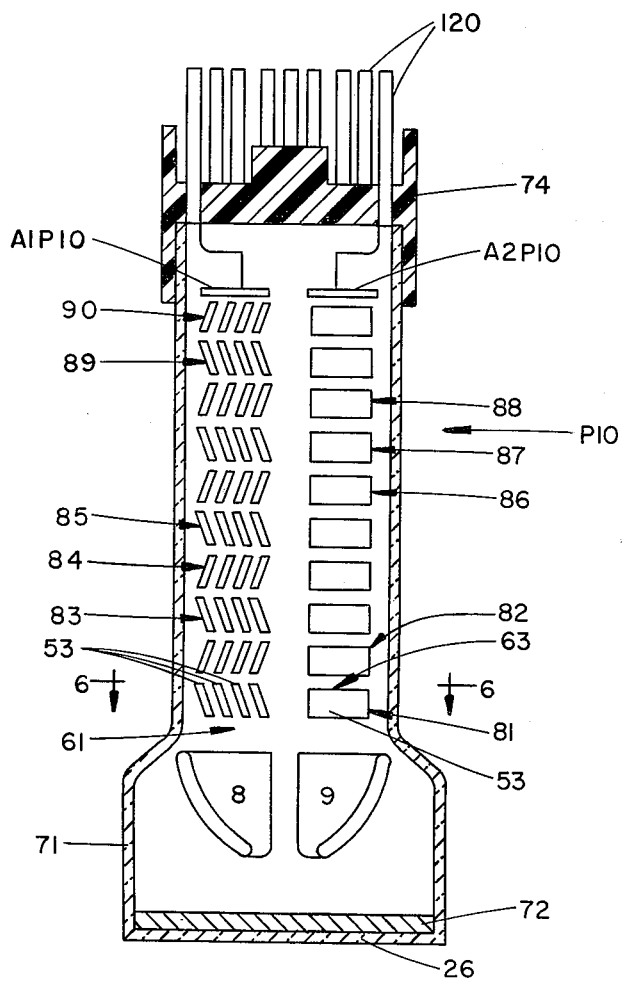
FIG. 5 is an elevational sectional view of a photomultiplier tube having a plurality of anodes for use in this invention.

Each of the photomultiplier tubes is constructed in a manner identical with that of photomultiplier tube P10 illustrated in FIG. 5. P10 is comprised of an evacuated envelope 71 a portion of which is a light sensitive face 26 in optical communication with the crystal 37. A light sensitive photosurface in the form of a photocathode 72 is located proximate to the light sensitive face 26 of the envelope 71. This photocathode is capable of absorbing the light photons emitted by the scintillation crystal 37 and emitting electrons in a quantity proportional to the number of photons of light received. These electrons are not emitted uniformly over the area of the photocathode 72. Instead, more electrons are emitted from that area of the photocathode 72 closest to the light source than are emitted from other areas of the photocathode 72 more distant from the light source. The photocathode 72 is connected to the cathode terminal of a direct current power source to provide for the replacement of the electric charge lost by photoelectric emission, thus maintaining the required potential on the photocathode.

Figure 6:
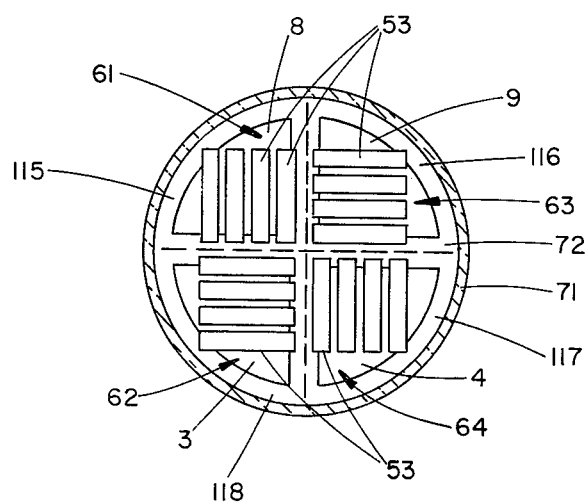
FIG. 6 is a sectional plan view of the phototube of FIG. 5.

The electrons emitted from the photocathode 72 are received by the dynode slats in an initial dynode stage located diagonally opposite the sector of the photocathode from which the electrons emanate. That is, electrons emitted from the photocathode 72 are channeled by electron partitions, such as partitions 3, 4, 8 and 9 in FIGS. 5 and 6 and are attracted to a specific one of the four slat arrays 61, 62, 63 or 64 in the initial dynode stage. To illustrate, the photocathode 72 may be considered to be divided by imaginary dotted lines into four sectors or quadrants 115, 116, 117 and 118. Electrons emanating from sector 115 will produce the largest response at dynode slat array 64. By the same token electrons from sector 116 will produce a principal response at slat array 62 while sectors 117 and 118 will produce responses primarily in slat arrays 61 and 63 respectively. The individual slats 53 in each of the slat arrays are arranged at an angle of roughly 45° with respect to the path of the electrons and are so oriented as to cause the electrons emitted to move toward the dynode positioned directly above it, and ultimately to the anode positioned directly above it. In FIG. 5, it can be seen that the anode A2P10 is positioned directly above the slat array 63, and the anode A1P10 is positioned directly above the slat array 61. As in conventional photomultiplier tubes, an electron impinging upon one of the plates 53 in the first dynode 81 will cause the emission of several more electrons, which then proceed to the second dynode 82 where the process is repeated. This electron cascade continues through dynodes 83 through 90. The electrons finally impinge upon a single one of the anodes. For example, the electrons emanating from the slat array 61 of the first dynode stage 81 will cause electrons to be received by the anode A1P10. Similarly, electrons from the slat array 63 will cause an electron impact on anode A2P10. It can be seen that with a plurality of anodes located within the envelope 71 as indicated, each anode is associated with an ascertainable sector of the photocathode 72 and provides an identifiable anode output signal on the leads 120 uniquely associated with that anode. Other of the leads 120 are connected to the various dynode stages and to the photocathode 72. As previously indicated, the partitions 3, 4, 8 and 9 are located between the cathode and the first dynode and are structures designed to assure that electrons from the cathode reach the corresponding first dynode.

The photomultiplier tube P10 operates in a manner similar to the tube type F4002 (S1) manufactured by the Electron Tube Division of ITT Corporation, 3700 East Pontiac Street, Fort Wayne, Indiana, but is a geometrical variation thereof.

While other phototubes with plural anodes have been proposed for viewing scintillations, these tubes have often proved unsuccessful. For example, U.S. Pat. No. 3,209,201 illustrates a system in which only a single phototube is used to view an area of interest and in which variable weighting is attributed to the individual signals from the anodes to determine X and Y co-ordinates. To the contrary, signals from the anodes in the present invention represent the amount of light received at a specific point or area, such as the points 30 and areas 32 in FIG. 4, as will be hereinafter explained. In the illustrated embodiment of the invention, the plurality of anodes in the photomultiplier tubes along with their associated position responsive circuitry collectively function as a second order position resolving means responsive to signals from the scintillation crystal 37. A single anode and its associated position responsive circuit are enclosed in dotted lines of envelope 6 in FIG. 7. Collectively all of the component elements corresponding to those encompassed within the envelope 6 for all of the anodes for all of the photomultiplier tubes may be considered to be the second order co-ordinate determination means. This second order position resolving means, in the embodiment illustrated, is encompassed within the glass envelopes 71 and the associated position responsive circuitry of the photomultiplier tubes. The second order position resolving means may therefore be considered to be encompassed within the first order resolving means, and is used to provide fine co-ordinate signals representing the locations of detected radioactive events in contra-distinction to the coarse co-ordinate signals which are provided by the summation of the total outputs from a single photomultiplier tube. The output of the anodes thereby represents a further refinement of the position co-ordinates produced on the display module 70 of the scintillation camera system.

As previously explained, each anode in the photomultiplier tubes is particularly responsive to flashes of light emanating from a sector encompassing only a part of the area of the scintillation means viewed by the associated phototube. For example, with particular reference to FIG. 3, a single anode may be considered to be associated with a single one of sectors 32 comprising the coterminous hexagonal areas 29. The second order co-ordinate determination means thereby produces output signals representing coterminous composite sectors 32 of the areas 29. The signal from each anode may be considered to represent the amount of light received at an associated one of the interstitial points 30 and 30' in the rectangular matrices of FIGS. 4 and 3, respectively. These interstitial points, for example the points 30, are interspersed among the principal points 25 and are spaced from each other at predetermined sub-intervals. With reference to FIG. 4, the principal points are spaced from each other by a distance S in the X direction and a distance D in the Y direction. The interstitial points 30 are spaced from each other by a distance I in the X direction and J in the Y direction. The interstitial points 30 are spaced from the principal points 25 by a distance I in the X direction and a distance J in the Y direction. As illustrated, each of the second order spacing sub-intervals is smaller than the corresponding first order spatial interval S or D. The interstitial points 30 and 30' thereby provide additional reference points which are used in interpolating distances in the determination of the coordinates of impinging radiation in the scintillation crystal 37. There is some latitude in the exact location which the reference points may be considered to represent. For example, the reference points 30 in FIG. 4 represent the centroids of each of the sectors 32 comprising hexagonal areas 29. In another embodiment, the reference points 30' each represent the centroid of an associated quadrant 31 comprising circles inscribed within the hexagonal areas 29 and corresponding to the circular areas of contact of the photosensitive surfaces 26 of the photomultiplier tubes P1 through P19 with respect to light pipe 45. Other alternative choices of the exact locations of reference points will become apparent to those familiar with the optical properties of scintillation cameras.

Figure 7:
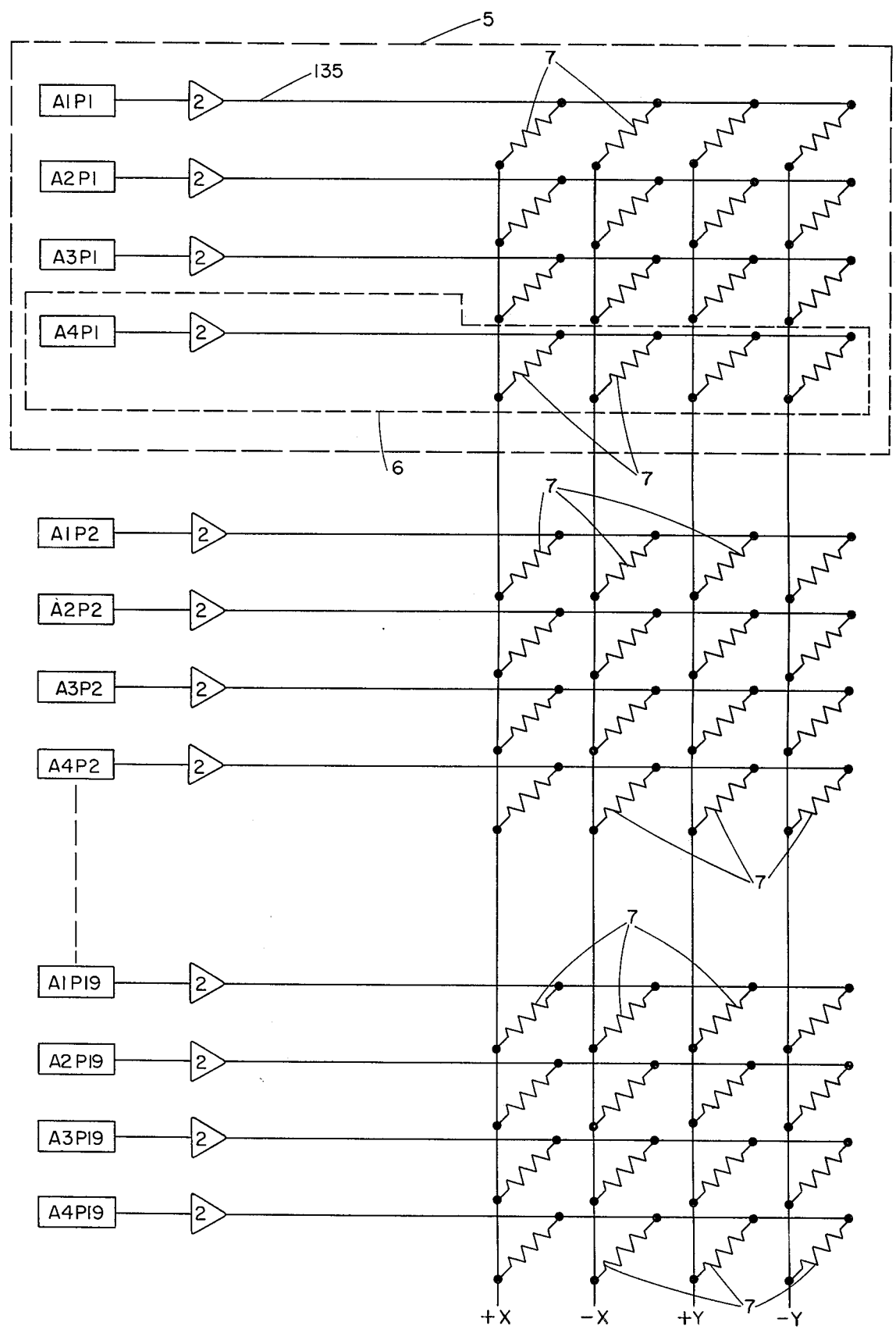
FIG. 7 illustrates the electronic circuitry employed in a preferred embodiment of the present invention.

The scintillation camera system of this invention comprises amplifying and position computing circuitry coupled to the anodes of the photomultiplier tubes for producing electrical signals corresponding to co-ordinates in a rectilinear co-ordinate system of scintillations produced in response to radiation impinging upon the scintillation crystal. This amplifying and position computing circuitry is connected to the anodes of the phototubes and resolves the outputs of the phototubes in response to each flash of light into co-ordinate signals corresponding to the co-ordinates of impinging radiation in the scintillation crystal. The amplifying position sensitive circuitry is comprised of four co-ordinate signal lines +X, −X, +Y, and −Y as well as resistors 7 in FIG. 7 which allow a signal of the appropriate magnitude to be produced on the co-ordinate signal lines. The resistance values of the resistors 7 are determined in accordance with the positions of the sectors 32 (and in particular the associated interstitial reference points) with respect to the X and Y axes in the two dimensional co-ordinate system of FIG. 3 or FIG. 4. The resistance values of the resistors 7 connected to either or both the +X and −X or +Y and −Y co-ordinate signal lines will therefore ordinarily vary for adjacent anodes. These resistors apply a separate factor of consequence to each signal transmitted from each of the anodes in correlation with the co-ordinate location represented by each anode in a two-dimensional co-ordinate system. The matrixing system of FIG. 7 is a modification of a present commercial version of a scintillation camera constructed for use with the present invention. It should be understood, however, that other matrixing approaches using capacitors as impedance elements or delay line amplifiers have been used in the construction of scintillation cameras, and are adaptable for use with the present invention.

The scintillation camera of this invention further includes a weighting circuit means connected to the anodes for amplifying the output signals therefrom in a non-linear fashion wherein the larger anode output signals receive greater amplification than smaller anode output signals, thereby enhancing the relatively accurate signal information contributed by anodes associated with sectors 32 of areas 29 near each scintillation in preference to the relatively inaccurate signal information derived from more distant sectors. In FIG. 7 this weighting circuit system comprises a threshold preamplifier circuit 2 in which the anode output signals of less than a preselected threshold magnitude produce substantially no contribution to the location coordinates of scintillations. This threshold magnitude is established by the selection of threshold appropriate criteria for the preamplifiers 2 in FIG. 7. The anode output signals at least equalling the preselected threshold magnitude of the preamplifiers 2 produce amplified output signals substantially proportional to the magnitude of the anode output signals from which they are derived over a significant portion of the amplitude spectrum of the anode output signals. For example, an output of the anode A1P1 exceeding the threshold setting of preamplifier 2 will produce a signal of proportional amplitude on the line 135.

The weighting circuit may also be considered as including the resistors 7 of the amplifying and position computing circuitry. As heretofore discussed, a location registration means, in the form of a display module 70 is connected to the output of the amplifying and position computing circuitry for registering and recording the coordinates of detected radiation.

It should be understood that the above disclosure and drawings have been given for purposes of illustration only, and no unnecessary limitations should be construed therefrom. For example, virtually any plural number of anodes may be employed in place of the four anode photomultiplier tubes illustrated. Also, delay line amplification used with multiplier anode tubes may be employed to the same advantage as are the resistors 7. Alternatively, single anode photomultiplier tubes may be used in place of the multiple-anode phototubes depicted if different sectors of the photocathode of a tube are coated with some material which shifts the energy of wavelength of scintillations received so that the resulting phototube pulses can be identified as emanating from a particular electrical In addition, the various features found in conventional scintillation camera systems may be modified as necessary and incorporated into the scintillation camera system disclosed herein.

I claim:

1. A radiation imaging device comprising scintillation means producing flashes of light therein at the locations of impinging quanta or radiation, a plurality of phototubes each positioned for viewing a particular area of said scintillation means and each comprising a plurality of anodes for generating discrete electrical output signals, each anode being particularly responsive to flashes of light emanating from a sector encompassing only a part of the area of said scintillation means viewed by the associated phototube, and electrical circuit means connected to the anodes of said phototubes and resolving the outputs of said anodes in response to each flash of light into co-ordinate signals corresponding to the co-ordinates of impinging quanta of radiation in said scintillation means.

2. In a scintillation camera for producing an image of the distribution of radioisotopes within an object and employing a single, laminar scintillation crystal, a plurality of photomultiplier tubes each viewing a particular area of said crystal whereby mutually overlapping viewing areas exist, amplifying and computing circuitry for producing electrical signals representing the co-ordinates in a two dimensional matrix of the locations of interaction of quanta of radiation with said crystal, and location recordation means for recording the aforesaid co-ordinates of interaction, the improvement wherein each of said photomultiplier tubes is comprised of a plurality of anodes each particularly responsive to scintillations emanating from a determinable sector of the particular area in view.

3. A scintillation camera for depicting in a two dimensional co-ordinate system the distribution of radiation emanating from an object comprising:
   a. a laminar scintillation crystal,
   b. a plurality of photomultiplier tubes spaced from said crystal to view overlapping portions thereof, each photomultiplier tube comprising an evacuated envelope having a light sensitive face in optical communication with said crystal, a plurality of anodes located within said envelope each associated with an ascertainable sector of said light sensitive face and providing an identifiable anode output signal,
   c. amplifying and position sensitive circuitry coupled to the anodes of the aforesaid photomultiplier tubes for producing electrical signals corresponding to the co-ordinates in the aforesaid co-ordinate system of scintillations produced in response to radiation impinging upon said scintillation crystal, and
   d. location registration means connected to said amplifying and position sensitive circuitry for recording the aforesaid co-ordinates.

4. The scintillation camera of claim 3 further comprising weighting circuit means connected to the aforesaid anodes for amplifying the output signals therefrom in a non-linear fashion wherein the larger anode output signals receive greater amplification than smaller output signals, thereby enhancing the relatively accurate signal information contributed by anodes associated with sectors of areas near each scintillation over the relatively inaccurate signal information derived from distant sectors.

5. The scintillation camera of claim 4 wherein said weighting circuit means comprises a threshold preamplifier circuit in which the anode output signals of less than a preselected threshold magnitude fail to produce any substantial contribution to the aforesaid co-ordinates and the anode output signals which at least equal sid preselected threshold magnitude produce amplified output signals substantially proportional to the magnitudes of the anode output signals over a significant portion of the amplitude spectrum of the anode output signals.

6. The scintillation camera of claim 3 further comprising co-ordinate signal lines connected to said location registration means, and separate resistor means are connected from each of said anodes to each of said co-ordinate signal lines to apply a separate factor of consequence to each signal transmitted from each of said anodes in correlation with a coordinate location represented by each anode in a two dimensional co-ordinate system.

7. The scintillation camera of claim 6 wherein the resistor means have different values of resistance chosen to correspond to the distance of the associated co-ordinate location represented by each anode from the appropriate axis in a two dimensional co-ordinate system.

* * * * *

UNITED STATES PATENT OFFICE
CERTIFICATE OF CORRECTION

Patent No. 3,937,964    Dated February 10, 1976

Inventor(s) Gerd Muehllehner

It is certified that error appears in the above-identified patent and that said Letters Patent are hereby corrected as shown below:

At column 8, line 62:

"of" first occurrence should be -- or --.

At column 8, line 64:

"electrical" should be "sector"

At column 9, line 4:

"or" should be "of"

At column 10, line 25:

"sid" should be "said"

Signed and Sealed this eighth Day of June 1976

[SEAL]

Attest:

RUTH C. MASON
*Attesting Officer*

C. MARSHALL DANN
*Commissioner of Patents and Trademarks*